United States Patent [19]
Birkbeck et al.

[11] 4,052,960
[45] Oct. 11, 1977

[54] FISH REARING SYSTEM

[75] Inventors: Alexander E. Birkbeck, Delta; Cecil Craig Walden, Vancouver, both of Canada

[73] Assignee: Province of British Columbia, Canada

[21] Appl. No.: 620,398

[22] Filed: Oct. 7, 1975

[30] Foreign Application Priority Data

Oct. 2, 1975    Canada .................. 236,875

[51] Int. Cl.² ............................................. A01K 63/00
[52] U.S. Cl. ................................... 119/3; 210/169
[58] Field of Search ............... 210/169, 194, 63, 195, 210/196, 198, 200, 205, 388, 389; 119/3

[56] References Cited

U.S. PATENT DOCUMENTS

| | | | |
|---|---|---|---|
| 1,242,982 | 10/1917 | Reynolds | 210/388 |
| 2,050,771 | 8/1936 | Wait | 210/192 |
| 3,116,712 | 1/1964 | Ogden et al. | 210/169 UX |
| 3,336,099 | 8/1967 | Czulak et al. | 210/169 |
| 3,365,383 | 1/1968 | Blair | 210/169 X |
| 3,545,619 | 12/1970 | Ettlich et al. | 210/196 |
| 3,550,774 | 12/1970 | Hirs et al. | 210/195 |
| 3,669,297 | 6/1972 | Willinjer | 210/169 |
| 3,748,262 | 7/1973 | Lee et al. | 210/194 |
| 3,775,314 | 11/1973 | Beitzel et al. | 210/638 |
| 3,835,813 | 9/1974 | Katz | 210/169 |
| 3,856,671 | 12/1974 | Lee et al. | 210/194 |
| 3,888,210 | 6/1975 | Buss | 119/3 |
| 3,945,918 | 3/1976 | Kiuk | 210/44 |

*Primary Examiner*—Theodore A. Granger
*Attorney, Agent, or Firm*—Larson, Taylor and Hinds

[57] ABSTRACT

A fish rearing system. The fish rearing system includes a rearing tank, filtration means and means to recycle water in the system. The system includes an ozone contact unit in which, when the system is in use, a predetermined amount of recycling water can be contacted with ozone in an amount sufficient to lower the total nitrite content of the water to a level acceptable to fish life but not leave free ozone in the water re-entering the rearing tank.

9 Claims, 3 Drawing Figures

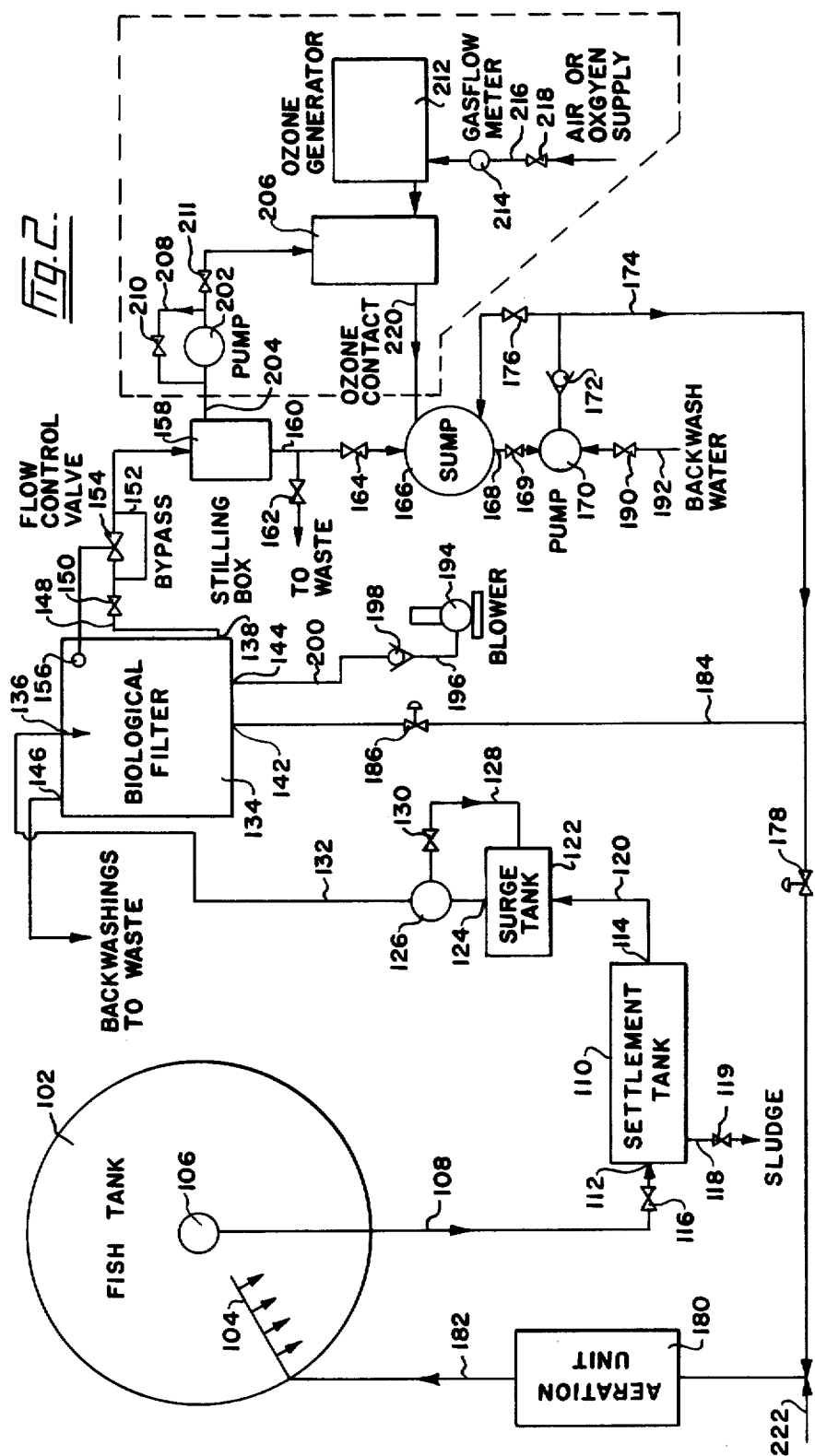

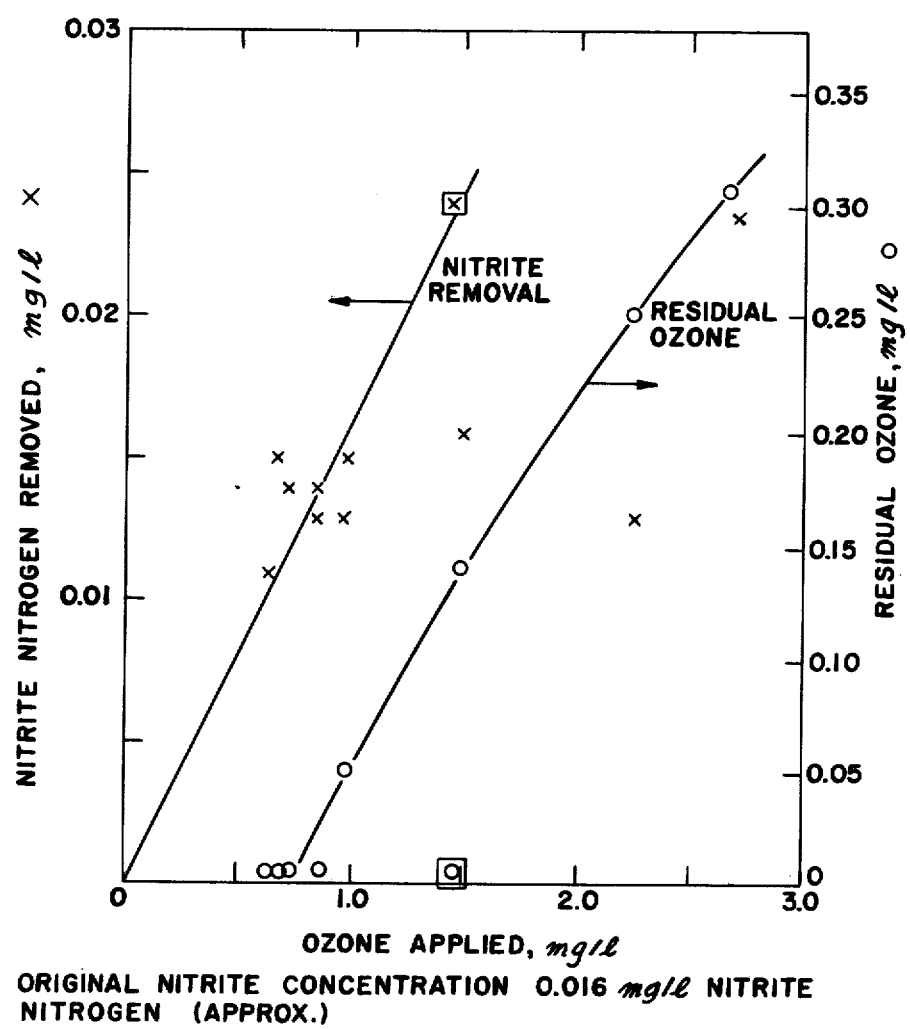

FISH REARING SYSTEM

BACKGROUND OF THE INVENTION

1. Field of the Invention

This invention relates to a recycling fish rearing system and, more particularly to such a system including an ozone contacting unit for recycling water in which effluent water from a fish rearing tank can be treated with ozone and reused in the rearing tank.

2. Description of the Prior Art

There is an increasing demand for sport and commercial fishes. This demand can only be satisfied by means of hatcheries or similar operations. These fish rearing systems require large amounts of water to operate on an appropriately large scale. Waters have normally been drawn from rivers or lakes. Such waters may vary rapidly in quality and thus endanger fish stocks.

Reuse or recycling of water is becoming increasingly desirable because there is a diminishing water supply of suitable quality; risks to fish stocks occur due to the use of low quality water, variations in flow rate, solid content and disease levels. In addition pollution abatement costs are high for single pass systems.

In theory at least, reuse and recycling of water can provide: a substantial reduction in water requirements; optimization of fish growth rate by regulation of the water temperature; control of disease by sterilization of intake water; and reduction of overall water supply and pollution abatement costs.

The essential requirements of a water reconditioning system for a fish rearing system must include means to control the level of suspended solids such as fish feces and unused fish food, and ammonia and carbon dioxide. The water must not contain toxic levels of nitrite ion which is produced in many rearing systems and the water must be returned to the fish rearing tank of the system with sufficient dissolved oxygen for fish respiration.

Burrows et al in the Progressive Fish Culturist, 30: 123 to 136, 1968 described the use of a downflow flooded filter consisting of a 4 foot layer of half inch to 3 inch rock covered with a 1 foot layer of ¼ to ⅜ inch oyster sheels. Unsettled hatchery effluent was applied at 0.83 gallons per minute per square foot of filter area. This unit has found practical application at the Dworshak Fish Hatchery in Oregon and has been installed by the Canadian Fisheries Service at the Capilano Hatchery in North Vancouver. However oyster shells were omitted from the latter application. Extensive operational problems have been encountered at Dworshak. These have been due principally to the blinding of the filters, to algae growth and to poor flow maintenance.

In Technical Report No. 67, New Mexico State University, 1970, 119 pp. Gigger et al described the use of filters consisting of ⅜ inch gravel or plastic media available under the trade mark SURFPAC in a semi-pilot scale test with 6 inch rainbow trout as the test species. Flow rate ranged from 3.5 to 5.34 gallons per minute per square foot and bed volumes were replaced at 1.39 to 4.19 minute intervals. The filter removed 150 to 200 mg. of ammonia nitrogen per hour per cubic foot of media. However the exposure time of fish in these tests was too short to assess long time ammonia toxicity effects. Furthermore no nitrate measurements were made on the test unit.

McCrimmon et al in the Progressive Fish Culturist 28: 165 to 170, 1966 described a laboratory scale water recirculation unit for holding trout. The unit involves sand filtration and carbon contacting of the recirculated water. Scott et al in Journal of the Fisheries Research Board of Canada 29: 1071 to 1074, 1974 showed that hatchery rearing water could be recycled by filtering through a two stage high rate filtration system using large particle anthracite coal. In their experiments the fish grew rapidly with negligible mortality. pH was maintained in the range of 6.5 to 7.5 but ammonia levels fluctuated widely in the range 4 to 22 milligrams of ammonia nitrogen per liter. Problems were also encountered with backwashing the filter.

Mayo et al, in "A Study for Development of Fish Hatchery Water Treatment Systems" prepared for Walla Walla District Corps of Engineers in co-operation with the U.S. Department of the Interior, U.S. Bureau of Sports, Fisheries and Wildlife, by Kramer, Chin and Mayo, Seattle, 1972, 42 pp., compared biological filter systems using one inch and three and one half inch Koch rings and one quarter inch foamed polystyrene (Styrofoam) pellets as the filter media. The systems were compared with biological systems designed on the activated sludge tank technique. The tests showed that all systems — biological filter or activated sludge — could be used for pollution control abatement but filter systems were more reliable when water reuse was a primary objective. Problems with nitrite toxicity occurred but these could be avoided by using controlled programs of management which would allow gradual increase in the fish load, thereby limiting the level of nitrite produced in the system.

Our co-pending United States application Ser. No. 573,548 entitled "A Fish Rearing System" describes a fish rearing system in which the fish rearing tank communicates with a primary filtration means to which water from the fish rearing tank is directed. The primary filtration is to remove particulate material rapidly. After the primary filtration means, the water passes to a biological filter of a particulate medium. This biological filter has a backwash means that includes an air blower whereby, during backwash, the filter medium is moved vigorously. In normal operation, that is when water is recycling, the water passes from the biological filter to an aeration unit where it is aerated and passed back to the rearing tank. During backwashing the water used in the backwashing is directed to waste. The system includes pump means to move water throughout the system and conduit means whereby water can be fed throughout the system.

The primary filtration means may be any filtration means able to remove a substantial proportion of particulate matter coming from the fish tank with low retention time of the water in the filtration means and, what is especially important, without blinding, that is blocking, of the filtration means. In general the primary filtration means should be able to remove up to 60% of the solids from the fish tank water in a dwell time in the filtration means of up to about 15 minutes. In a preferred embodiment described in our co-pending application the particulate medium of the biological filter comprises particles having a size in the range of 0.5 to 10 millimeters. Appropriate media include sand, granite, anthracite, glass beads or plastic beads having the above size. Typically a filter medium depth of about 30 inches has proved useful.

Using the above system, 76% conversion of ammonia by oxidation was obtained in the biological filter with hydraulic loads of 3570 gallons per square foot per day.

The filter operated satisfactorily with ammonia loadings up to 0.002 pounds per cubic foot per day. The system gave substantially better results than any prior art system and is potentially capable of treating loadings of 0.004 pounds per cubic foot per day of ammonia nitrogen. However, problems with nitrite production become substantial at this loading level.

A review of the data obtained by investigators of hatchery reconditioning systems is presented in Table 1. The most significant feature of this data in relation to the present application is that measurable levels of nitrite ion were present in water to which fish were exposed in all the recycle units.

These systems are often subject to nitrite toxity problems. Moreover, nitrite toxemia is a major problem occurring in conventional recycle systems for fish rearing. The only presently available course by which nitrite toxicity may be avoided by operators of recycle hatchery systems is to carefully regulate fish loads so that nitrite levels are similar to those indicated in Table 1 (0.02 to 0.10 mg $NO_2$—N/l).

The presence of nitrite ion in water is known to produce changes in fish blood methemoglobin content. This reduces the blood oxygen transport capacity and hence lowers the fish's swimming ability and resistance to shock or desease. Tests carried out by Brown and McLeay "Effect of Nitrite Concentration on Acute Toxicity, Methemoglobin and Total Hemoglobin levels in Juvenile Rainbow Trout (*Salmo gairdneri*)". Prepared for the British Columbia Department of Public Works of Recreation and Conservation, Fish and Wildlife Branch, by B. C. Research, Vancouver, 1974, showed that the methemoglobin content of rainbow trout blood was increased significantly by nitrite levels as low as 0.015 mg $NO_2$—N/l and the 96-hour LC50 (i.e. the concentration producing 50% mortality at 96 hr) was 0.230 mg $NO_2$—N/l.

SUMMARY OF THE INVENTION

The present invention, according to its broadest aspects, is a recycling fish rearing system in which ozone is passed into the recycling water in an amount sufficient to bring the nitrite content of the water to a level that can be tolerated by the fish without leaving ozone in the water entering the rearing tank of the system.

It has been established by applicants that any level of free ozone detectable by present day analytical techniques is lethal to fish and also that effective sterilization of incoming water can only be achieved by ozone applications which produce toxic ozone levels in the water streams after treatment. Any hatchery utilizing ozone for sterilization of incoming water must effectively detoxify the ozonized stream before contact with fish by some means such as admixture with a stream having some chemical oxygen demand. Thus, the mixing of nitrite bearing waste streams or recycle water with ozone sterilized, nitrite stripped recycle water or ozone sterilized intake water serves two purposes. The nitrite can be used to remove toxicity due to residual ozone and conversely the ozone will oxidize nitrite to a desirable level. Indeed since the presence of nitrite can be detected relatively simply at below toxic levels (0.003 to 0.010 mg $NO_2$—N/liter) continuous monitoring and control of this ion provides a safety margin for both toxic substances.

Aspects of the invention are illustrated, by way of example, in the accompanying drawings, in which:

FIG. 2 is a schematic representaion of an apparatus that has been used in fish rearing trails, and FIG. 3 is a graph setting out results showing the removal of nitrite using the apparatus of FIG. 2.

DESCRIPTION OF PREFERRED EMBODIMENTS

Figure 1:
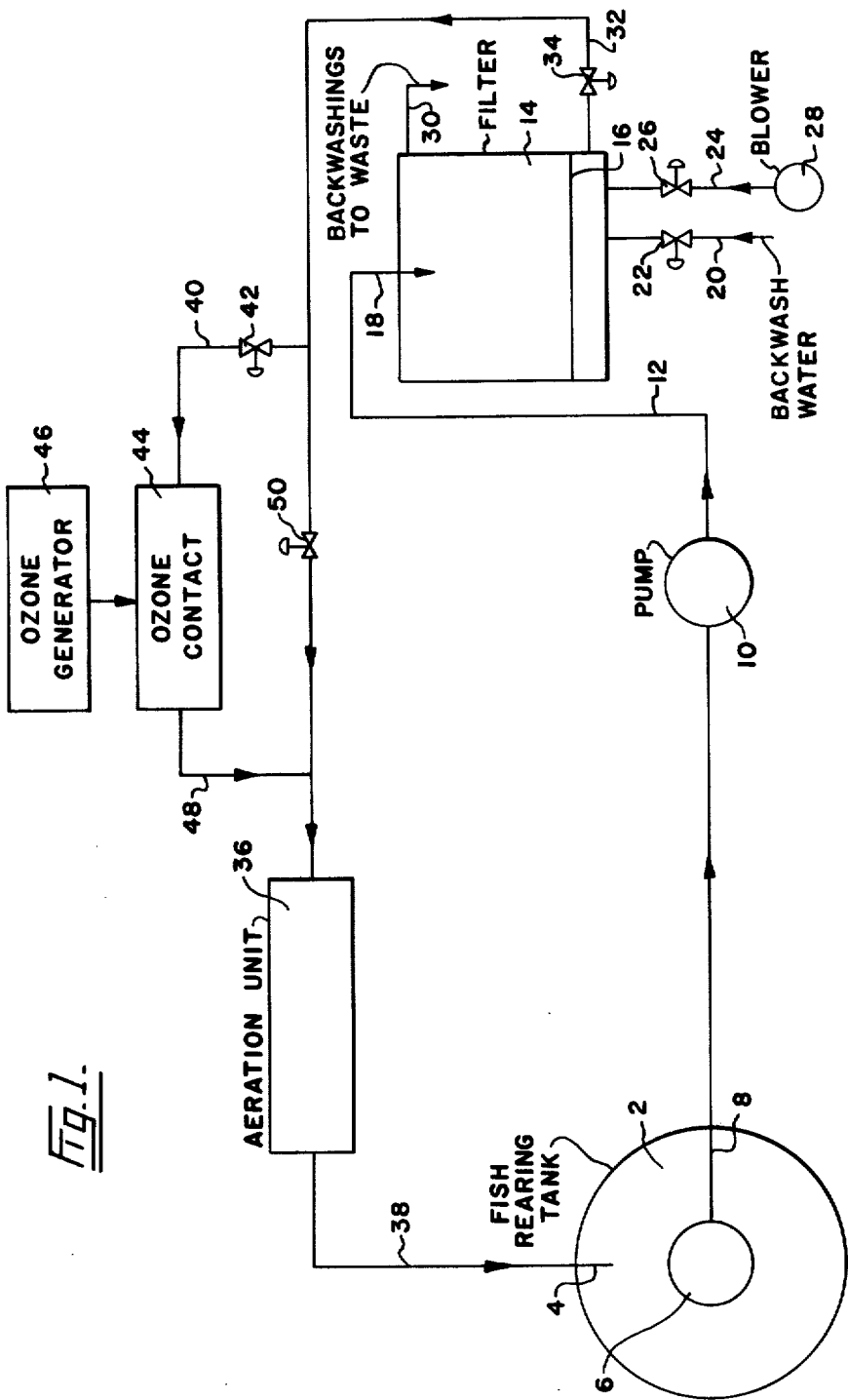
FIG. 1 is a schematic representation of the principal features of one embodiment of the present invention.

First, it must be emphasized that the present invention is applicable with any fish rearing system that recycles water. FIG. 2 of the drawings illustrates the invention as applied to a system described and claimed in our above co-pending application. The system of the co-pending application gives better results than all prior art systems known to applicant. These results are even further improved by the modification of the system according to the present invention.

FIG. 1 shows a fish rearing system comprising a fish rearing tank 2 having a recycled water inlet 4 and an outlet 6. Water moves along a conduit 8 to a pump 10. The pump 10 forces the water through conduit 12 to filter 14, which is shown in elevational section. The filter has a perforated, false floor 16. The water is forced into the top of filter 14 through inlet 18 above the false floor 16. The filter contains a particulate medium (not shown) supported on false floor 16 and is provided with backwash means comprising conduit 20 containing valve 22 and conduit 24 containing valve 26. The backwash means feed into the filter below false floor 16. A blower 28 is used to force air through the conduit 24. Similarly backwash water is forced through the conduit 20 by means not shown.

TABLE 1

| | COMPARISON OF FISH REARING SYSTEMS | | | | | | | |
|---|---|---|---|---|---|---|---|---|
| Unit Type | Trickling Filter* | Upflow Filter* | Upflow Filter* | Downflow Filter+ | downflow Filter+ | Activated Sludge* | Extended Aeration* | Our Co-Pending Applicaton (FIG. 2) |
| Hydraulic load gpm/ft² | 2.0 | 2.1 | 1.7 | 0.75 | 0.72 | — | — | 1.64 to 2.48 |
| Retention Time (hr) | | | | | | | | |
| Filter or aeration tank | 0.294 | 0.236 | 0.265 | 0.47 | 0.43 | 0.37 | 1.46 | 0.1 to 0.16 |
| Total system | 1.2 | 0.58 | 0.83 | 0.93 | 1.2 | | | 1.2 to 1.7 |
| Filter depth (feet) | 4 | 4 | 4 | 4 | 4 | | | 2.5 |
| Media type | Koch Rings | Koch Rings | Styrofoam | Osyter | Gravel | | | Sand |
| Media size (inch) | 3.5 | 3.5 | 0.25 to 0.5 | 0.25 to 3.0 | 0.25–1.5 | | | 0.04 |
| Volume to treat 1 mgd (cu ft) | 1,390 | 1,323 | 1,635 | 3,707 | 3,861 | | | 701 to 1,059 |
| Ammonia removal (%) | 30 | 19.7 | 33.8 | 33.2 | 20.9 | poor | poor | 76 |
| Ammonia in contact with fish** mg $NH_3$-N/l | 0.1 to 1.26 | 0.13 to 2.4 | 0.17 to 2.33 | — | — | 0.18 to 2.56 | 0.03 to 3.150 | 0.015 to 0.18 |
| Nitrite in contact with fish** mg $NO_2$-N/l | 0.03 to 0.07 | 0.05 to 0.11 | 0.06 to 0.11 | — | — | 0.001 to 0.73 | 0.01 to 1.83 | 0.02 to 0.09 |

*Mayo et al
+Burrows type filters
**During good operation

Filter 14 has a backwashings outlet 30 above false floor 16 and a recycled water outlet leading to conduit 32 below false floor 16. Outlet 32 has a valve 34. Conduit 32 leads to an aeration unit 36. Water passes from the aeration unit 36 to conduit 38 and hence back to the recycled water inlet 4 of the fish rearing tank 2.

A part of the water in conduit 32 is led into a conduit 40 by opening a valve 42. This water passes through a ozone contact unit 44 in which ozone, usually in the form of ozonized air or ozonized oxygen, is contacted with the water. The ozone is generated in ozone generator 46. The treated water is returned to conduit 32 through conduit 48. Proportionation of the supply of water to ozone contact unit 44 is controlled by valve 42 in conduit 40 in conjunction with a second valve 50 in conduit 32. The amount of water fed to the ozone contact unit 44 will be determined by analysis of the nitrite content of water leaving the filter 14. The amount of ozone fed into the water will be such as to reduce the total nitrite content of the recycling water to a level acceptable to fish. It is extremely important that the ozone should not be in excess because of its toxicity to fish. Therefore, the amount fed into the water by ozone contact unit 44 will be such that there will be an excess of ozone in the water leaving ozone contact unit 44 and entering conduit 48. However, the amount of excess ozone must be such that it will react with sufficient nitrite in the water in the system to lower it to an acceptable level but all the remaining ozone must react with nitrite in the water not passed through the ozone contact unit 44 before the water is fed back to the fish rearing tank 2. Although the portion of the water to be treated may range from 0 to 100% of the water in the system it is the amount of nitrite in the water sent back to the tank 2 and the absence of ozone from the water that is important.

In use fish are reared in the tank 2 and the effluent water passes to the pump 10. A preliminary filtration to remove relatively large solids, such as feces and unused food may desirably be carried out. These solids are passed from the system as sludge. The water is pumped by pump 10 through the filter 14. The principle function of the filter is to act as a biological filter unit and to oxidize toxic ammonia nitrogen originating from fish food, urine and feces, accumulated in the system due to the recycling, into the non-toxic nitrate form. In addition to suspended impurities, and other, essentially small impurities, are removed here.

From the filter 14 the water passes through conduit 32 and valves 34 and 50 to aeration unit 36. The aeration unit 36 resupplies oxygen to the water and, simultaneously, strips carbon dioxide from the water. Any aeration means may be used in the system of the present invention. These means include a cascade tower, cascading the filtered discharge down an open channel with turbulent flow induced by slats spaced at intervals across the floor of the channel, diffused air, Venturi injection and spray nozzles.

A part of the water is treated with ozone as described above.

The water is able to support fish life and is returned to the fish rearing tank 2.

The biological filter 14 must be backwashed periodically to remove accumulated solids. In order to backwash the filter, pump 10 is stopped, valve 34 is closed and valves 22 and 26 in conduits 20 and 24 are opened. Backwash water is then forced by means (not shown) through conduit 20 in an upwards direction through the filter 14. Blower 28 is started and blows compressed air through conduit 24 and upwards through the filter 14. The air and water must be balanced in a manner that lifts and expands the bed causing violent agitation of the particles, which scours off agglomerated particulate matter. As an alternative the air and water may be applied in alternating surges to achieve the same objective. The backwashings are forced out through conduit 30. After the appropriate length of time the backwash water supply is stopped. Blower 28 is switched off. Valves 22 and 26 are closed and valve 34 is opened. Pump 10 is then started and the system continues to recycle water back to the fish rearing tank 2.

FIG. 1 illustrates the essentials of an embodiment of the present invention. A practical embodiment of the invention that has been used in achieving excellent results is shown in FIG. 2 of the drawings.

FIG. 2 is a diagrammatic plan of a fish rearing system. The system comprises a fish rearing tank 102 having a recycled water inlet 104 and an outlet 106. Effluent from the tank 102 passes through the outlet 106 to conduit 108 to a settlement tank 110. Tank 110 has an inlet 112 and an outlet 114. A weir (not shown) may be positioned adjacent to the inlet 112 and a weir (not shown) may be positioned adjacent to the outlet 114. Flow into the settlement tank 110 is controlled by valve 116 and the level of the weir adjacent to outlet 114 in the settlement tank 110. Conduit 118 equipped with a valve 119 removes sludge from the settlement tank 110.

Settlement tank 110 may be a simple horizontal flow settlement tank or may be modified by the addition of sloping tubes or plates or similar devices.

From the settlement tank 110 water passes through conduit 120 to a surge tank 112. The surge tank 112 has an outlet 124 for recycling water. From outlet 125 water passes to a pump 126. From pump 126 water is pumped into either conduit 128 through valve 130 and back to the surge tank 124 or, in the main, to conduit 132 and then to biological filter 134.

Biological filter 134 comprises a container having a perforated false floor (not shown, but as in FIG. 1), and inlet 136 for recycling water above the top of the filter and an outlet 138 for recycling water below the false floor. There is an inlet 142 for backwash water and an inlet 144 for backwash air both below the false floor. The filter has an outlet 146 for backwashings above the false floor and the top of the filter media. A particulate filter medium, not shown, is positioned on the false floor. The particulate medium has a size in the range 0.5 to 10 millimeters.

From outlet 138 recycling water is fed into conduit 148 containing a valve 150. A bypass 152 and a flow control valve 154 are arranged in conduit 148. These, in conjunction with a float 156, control the level of liquid in the biological filter 134. Water from conduit 148 enters a stilling box 158. Water passes from the stilling box 158 to a conduit 160 and may be passed to waste through a valve 162. From waste the water may be dumped or disposed of during start-up procedures. However, usually the water passes through a valve 164 to a sump 166. Water passes from the sump 166 into a conduit 168 to a backwash and recycle pump 170. In conduit 168 there is a valve 169. In usual operation, that is, when water is recycling towards the fish rearing tank 102, water is pumped by pump 170 through non-return valve 172 into conduit 174. Flow can be regulated by a valve 176 permitting the passage of water back to the sump 166.

Normally water passes through conduit 174, through valve 178 to aeration unit 180. From here the water passes through conduit 182 to the recycled water inlet 104 of fish rearing tank 102. Typically the aeration unit may be, for example, a cascade tower but any known variation system may be used as discussed above with regard to FIG. 1.

In the embodiments of the invention illustrated in FIG. 2 the pump 170 is used to recycle water in the system and is also used to force backwash water through the biological filter 134. The illustrated apparatus must be backwashed regularly, for example, once a day. To enable backwashing the vavles 176 and 178 in conduit 174, valve 169 in conduit 168 and valve 150 are closed. By the closing of valve 178 water in conduit 174 is diverted into a conduit 184 that leads through a valve 186 into inlet 142 of filter 134. A valve 190 in a conduit 192 connected to a backwash water supply is opened. Valve 186 in conduit 184 is opened. Backwash water is then forced from pump 170 through non-return valve 172 to conduit 174. A blower 194 is started and blows air through a conduit 196, through a valve 198, through a conduit 200 and through the air inlet 144 of biological filter 134. The air is discharged through the perforated false floor of the filter unit and through the filter media via a multiplicity of diffuser nozzles (not shown). As a result the filter medium is violently agitated by the air and washed by the backwash water. The agitation greatly facilitates the washing. Backwashings pass through outlet 146 to waste.

When sufficient backwashing has been carried out valves 186, and 190 are closed and valves 169, 176, and 150 are opened. The system then operates by recycling water back to the fish rearing tank 102.

Valve 198 is a non-return valve to prevent water flowing to the blower 194 when the latter is not operating.

According to the invention a part of the recycling water is treated with ozone. In FIG. 2, a part of the water leaving the stilling box 158 is forced by a pump 202 through conduit 204 to an ozone contacting unit 206. Unit 207 is any unit capable of introducing ozone, usually in the form of ozonized air or ozonized oxygen, into water. These units are commercially available. The flow rate through the unit 206 is controlled by selection of the power pump 202 and by a recycle line 208 containing a valve 210 in addition to valve 211 in conduit 204. Ozone is generated in an ozone generator 212. Again such generators are commecially available. Control of the amount of ozone applied is provided by gas flow meter 214 positioned in a conduit 216 admitting air or oxygen to generator 212 and by a valve 218 in conduit 216. After ozone contact, the water is returned to sump 166 through conduit 220. However, it may be re-introduced at any point in the system where adequate mixing, and thus removal of free ozone, can take place before the water is fed back to the fish tank 102. As description above in discussing FIG. 1, the amount of water fed to the ozone contact unit 206 and the amount of ozone fed to the water in that unit will depend on the amount of nitrite in the water leaving filter 134.

Fresh water may be added to the system though an inlet 22 in conduit 174 prior to introduction into the aeration unit 180.

Fish rearing tank 102 may be any fish rearing tank known in the art. Desirably the tank will be self cleaning, provided with an automatic feed device and have means for controlling the level of the water in the tank.

The settlement tank 110 is to remove from the system larger solids such as feces and unused food. This rapid removal of solids reduces the total load of solids, organic material and ammonia arriving at filter 134. The overall need of oxidation is minimized by removal of particulate organic matter, especially that material containing nitrogenous matter. The removal at an early stage prevents the possibility of the material being converted into a soluble form.

It must be emphasized that the function of the settlement tank 110 is to remove rapidly a substantial proportion of the particulate matter from the water coming from the fish tank 102. It must be able to remove the particulate matter with a low retention time of the water in the tank 110. The tank 110 may be replaced by any filtration means able to remove a substantial proportion, for example, up to 60%, of the particulate matter in the water from fish tank 102 with low retention time, preferably not greater than 15 minutes, and without blinding. Other filter means that can be used include (a) stationary screen without backwash including sloped and horizontal screens (b) rotating screens, and (c) stationary screens with backwashing. All these types of filters are known in the filtration art and are described in our above co-pending application.

Surge tank 122 is fitted with high and low level sensors and its function is to provide automatic control of the pump 126 delivering water to the biological filter 134. The recycle line 128 is arranged to discharge water into surge tank 124 and thus facilitate flow balancing.

The biological filter 134 removes small, suspended solids from the recycling water but it also removes toxic nitrogen compounds (ammonia and nitrite) by converting them to nitrate by microbiological reactions taking place on the filter medium. The job of the biological filter 134 is simplified by the removal from the system of larger solids in the settlement tank 110. In particular, by removing these solids at a relatively early stage in the recycling process subsequent conversion to ammonia is reduced and control of ammonia and nitrite in the recycling system is thus facilitated.

The stilling box 158 may have a flow meter associated with it to permit measurement of the flow in the system. The box 158 may be fitted with a weir (not shown) for flow measurement. The weir can be calibrated theoretically or simply by measuring the time to fill sump 166 for different flow rates when pump 170 is inoperative. Measurement of flow passing around the recycle unit can be recorded at the weir using a Stevens and Leopold chart recorder. However the mode and position of flow measurement is not restricted to the illustrated apparatus. Any proprietary equipment may be useful. This includes flume, notch, "measure-L" and propeller meter measuring means. Indeed flow measurement is not essential to the operation of the system of the invention as it is only required to aid flow control. Careful selection of pumping units can achieve the same objectives and maintain flow rates within the required limits.

The backwash and recycle pump 170 provides the means of forcing water through a pre-selected path. A centrifugal pump has proved useful.

Aeration unit 180 functions to add oxygen to the water and to strip carbon dioxide from the water. Any aeration unit able to carry out this task is suitable in the apparatus. A cascade type in which water is fed down an open channel may be used. Tubulent flow can be created by 2 inch high slats placed at intervals across the flow of the channel. However the aeration unit 180 may also be varied as described above for aeration unit 36 illustrated in FIG. 1.

The aeration unit need not be at the position shown in FIG. 2. It may be at any point after the biological filter although clearly it is desirable to place it as close as possible to the inlet 104 of the fish rearing tank 102.

Blower 194 used in the backwash cycle of the system of the present invention may be, for example, a blower fitted with a five horsepower motor with a variable speed drive. A leg or one-way valve is desirably present in conduit 196 to prevent backflow of water into the blower.

The biological filter unit 134 can consist of a layer, preferably approximately 30 inches deep, having particles of, for example, sand, granite or anthracite or plastic beads with a particle size of 0.5 to 10 millimeters, preferably 1 millimeter to 10 millimeters. The applied water flow rate is in the order of 2.5 Imperial gallons per square foot per minute or better which is greater than the flow rates used previously in filters used in fish rearing system. The filter 134 may operate with upwards or downwards flow. Water backwashing is carried out by forcing water against the normal recycling flow direction or, with upwards flow, by increasing the rate of flow to expand the bed.

The illustrated embodiments of FIGS. 1 and 2 may be varied by including a heating coil or a cooling coil, depending upon where the apparatus is to be used. Generally speaking no cooling system need be incorporated into the system as some cooling effect will be obtained by the aeration unit, especially when the aeration unit is a cascade unit. However, cooling may still be necessary in very high ambient temperatures. Similarly, at cold ambient temperatures the system may be fitted with heat exchange units. In FIG. 2 such heat exchange units are preferably disposed between the settlement tank 110 and the surge tank 114. The point of installation is not critical but at this point the oxygen level is probably low and the corrosion of the heating coils in thus reduced to a minimum. Useful heating and cooling units are those available for the art.

In operation makeup water is fed to the fish rearing tank 102 via inlet 222 either directly from supply or it may be reclaimed from an egg hatching process. It may or may not be sterilized prior to entering into the fish rearing tank 102. The most suitable point of introduction is prior to aeration as this maximizes the fish carrying capacity of the system. The level of water in the tank 102 is controlled, typically at about two and one half feet, by a leg in the conduit 108.

DEMONSTRATION OF PREFORMANCE a. Oxidation of Nitrogen Compounds with Ozone

The literature contains conflicting evidence regarding the effect of ozone on nitrogen compounds in wastewaters. Therefore, it was decide to carry out a series of tests to determine if ozone would oxidize ammonia and nitrite in fish hatchery wastewater and in partially nitrified recycled wastewater, respectively. Water from a single pass unit fish rearing tank was applied to an ozone-contacting system, and the influent and effluent analyzed for ammonia. The effluent applied to the system had an ammonia concentration of 0.18 mg/liter of ammonia nitrogen: the application of up to 3.65 mg/liter of ozone had no significant effect.

A similar test was carried out to assess the effect of ozone on nitrite contained in effluent from a fish tank which was operating on a 90% recycle.

The ozone source was a Grace Model LG-2-L2 Advanced Ozone Generator. This unit is capable of providing 3% ozone from a dry air stream at a maximum rate of 1 lb/day. Air supply was obtained originally from bottled air, and subsequently from a Webster type S Air Compressor fitted with a ¼ hp motor, a balancing tank and providing about 2 scfm at 45 psi. The air supply was passed through an oil filter and a silica gel drying unit before entering the ozone generator.

A contact tower was constructed from PVC pipe according to a design provided by W. R. Grace and Company, Davison Chemical Division. The unit consisted of a six ft length of 6-inch diameter PVC pipe containing a concentrically mounted 4-inch diameter PVC pipe sealed to the 6-inch pipe at the lower end. A centrally mounted dip tube extending to the base of the 4-inch pipe was connected at the top to an ozone mixing device supplied by the Grace Company. Water enters the mixing device through a 1-inch PVC line and is controlled by a gate valve, and monitored by a flow meter. Retention time in this unit at a water flow of 10 gpm was 0.9 min.

The ozonized air stream enters the mixing unit via a ⅜ inch stainless steel line fitted with a nonreturn valve to prevent backup of water into the ozone generating unit in the event of gas pressure failure. The water flow is down the dip tube, up the 4-inch pipe and down the 6-inch pipe. The treated water leaves through an outlet at the bottom of the outer 6-inch pipe.

It must be emphasized that the type of ozone unit used does not imply any disadvantage to be gained by that unit. Any proprietary unit will suffice providing that it produces ozone economically.

The data plotted in FIG. 3 indicates that 0.016 mg/liter of nitrite could be completely oxidized by 1 mg/liter of ozone. Residual ozone occurred in the contact tower discharge only when residual nitrite could not be detected.

In test runs with a recycle fish holding facility constructed according to FIG. 2 of our co-pending application, the disclosure of which is incorporated by reference, there was a rapid rise in fish mortality in the recycle unit when nitrite levels were in the range of 0.1 to 0.2 mg/liter of nitrite nitrogen. The conditions that led to this nitrite toxicity situation were a combination of hazards likely to occur in any hatchery based on a recycle principle and included:

high fish load
water temperature at optimum for growth (58°–60° F)
reduced water flow due to partial blockage of screens and pipes in the fish holding tank This malfunction provided an opportunity to test the efficiency of the ozone unit for removing nitrite. Accordingly, the apparatus was modified to conform with FIG. 2 of the accompanying drawings. The ozone source and contact tower was as described above. A 10.1 gpm portion of the biotreated effluent discharging from the biological filter of the recycle unit was fed to the ozone contact unit. The results are set out in Table 2 below.

The influent to the unit contained between 0.053 and 0.225 mg/liter of nitrite nitrogen; whereas, in the effluent the level was below the detection limit (0.003 mg/liter) on all but two occasions (Table 2). Residual ozone levels ranged from 0.03 to 0.33 mg/liter as the treated waste was recombined with the remaining wastewater stream. No residual ozone was detected at the header jets returning water to the rearing tank.

An ozone-nitrite balance was run when a composite sample of influent to the contact tower contained 0.156 mg/liter of nitrite nitrogen. The applied ozone was 0.198 lb and the amount of nitrite nitrogen oxidized was 0.0179 lb. Of the applied ozone, 0.043 lb remained as a residual, 0.019 lb was lost to the atmosphere, i.e., 0.136 lb was reduced, presumably by the nitrite. This corresponds to 7.6 lb of ozone per lb of nitrite. This is substantially better efficiency than was obtained in the static trial whose results are set out in FIG. 3. Based on the stoichiometric requirement of 3.43 g ozone per g of nitrite nitrogen, ozone utilization for nitrite conversion is 41% efficient. The nitrite levels in contact with the fish were reduced from 0.150 mg $NO_2$—N/1 to 0.075 mg $NO_2$—N/1. In addition, it is shown in Table 2 that the proportion of nitrite removed can be controlled by either varying the flow of water being treated by ozone or by leaving a high residual of ozone in the treated stream before returning it to the system. For example, on Day 12 a water flow of 10.1 gpm was treated with ozone and a low 0.03 mg/1 ozone residual was left in the stream. This flow represented 18% of the total flow, however, 29.8% of the nitrite was removed. On Day 18 a very high ozone residual was left in the waster stream (0.332 mg/1 ozone). This residual was completely utilized for nitrite oxidation before reexposure to the fish.

systems can be subjected to high nitrite content. Indeed, both settlement tank 110 and biological filter 134 can be replaced by one or more of the above systems.

We claim:

1. A fish rearing system in which water can be recycled, the system comprising the following components in combination:

a. a fish tank containing fish and having a recycle water inlet and an outlet;

b. primary filtration means having an inlet communicating with the outlet of the fish tank, a sludge outlet and a second outlet for recycling water, the primary filtration means being able to remove a substantial proportion of particulate matter from the water coming from the fish tank with low retention time of the water in the primary filtration means and without blinding of the filtration means;

c. a surge tank having an inlet communicating with the second outlet of the primary filtration means, a first outlet for waste and a second outlet;

d. a pump communicating with the second outlet of the surge tank and having an outlet;

e. a biological filter for oxidizing toxic ammonia nitrogen into the non-toxic nitrate form, said filter communicating with the outlet of the pump, the filter comprising a container having a false floor an inlet for recycled water above the false floor and an outlet for backwashings above the false floor, an outlet for recycled water, an inlet for backwash air and an inlet for backwash water below the false floor;

TABLE 2
REMOVAL OF NITRITE FROM RECYCLING FISH REARING WATER

| | Ozone (mg/l) | | Nitrite (mg N/l) | | Water Flow to Ozone Tower (gpm) | Nitrite Removed (lb/day) | Recycle Flow (gpm) | lb Nitrite in Recycle | % Nitrite Removed From System |
|---|---|---|---|---|---|---|---|---|---|
| | Applied | Residual | Before Ozone | After Ozone | | | | | |
| Day 1 | 1.63 | 0.060 | 0.225 | 0.003 | 10.1 | 0.0327 | 44.7 | 0.1446 | 22.6 |
| 2 | 0.70 | 0.0090 | 0.086 | 0.003 | 10.5 | 0.0130 | 42.5 | 0.0521 | 24.9 |
| 3 | | | 0.077 | 0.003 | 10.1 | 0.0111 | 46.2 | 0.0511 | 21.7 |
| 4 | 0.70 | 0.090 | 0.053* | 0.003 | 10.1 | 0.0077 | 49.5 | 0.0362 | 21.3 |
| 5 | 0.66 | 0.040 | 0.077 | 0.003 | 10.1 | 0.0111 | 51.2 | 0.0567 | 19.6 |
| 6 | | | 0.116 | | 10.1 | 0.0169 | 53.3 | 0.0873 | 19.3 |
| 7 | | | | | 10.1 | | 49.2 | | |
| 8 | 1.36 | 0.01 | 0.130* | 0.003 | 10.1 | 0.0189 | 48.8 | 0.0903 | 20.9 |
| 9 | 1.52 | 0.01 | | | 10.1 | | 50.5 | | |
| Day 10 | 1.42 | 0.01 | 0.112 | 0.006 | 10.1 | 0.0154 | 45.4 | 0.0732 | 21.0 |
| 11 | 0.87 | | | | 10.1 | | 55.2 | | |
| 12 | 1.36 | 0.030 | 0.195 (0.156*) | 0.003 | 10.1 | 0.0179 | 54.9 | 0.0972 | 29.8 |
| 13 | 0.48 | | | 0.003 | 10.1 | | 56.4 | | |
| 14 | 1.63 | 0.085 | | 0.003 | 10.1 | | 53.8 | | |
| 15 | | 0.070 | 0.100 | | 10.1 | 0.0145 | 48.7 | 0.0700 | 20.7 |
| 16 | 1.94 | 0.156 | | | 5.4 | | 52.4 | | |
| 17 | 3.10 | 0.228 | | | 5.4 | | 36.7 | | |
| 18 | 2.74 | 0.332 | 0.074 | | 5.9 | 0.0063 | 35.7 | 0.0380 | 16.6 |
| 19 | 2.53 | 0.192 | 0.065 | | 5.5 | 0.0051 | 48.0 | 0.0449 | 11.4 |
| 20 | | | | | | | | | |
| 21 | 1.76 | 0.288 | | | 10.1 | | 42.0 | | |
| 22 | 1.76 | 0.264 | 0.055 | | 10.1 | 0.0083 | 46.3 | 0.0367 | 22.4 |

*From Composite Sample

The use of ozone contact has been specifically described with reference to the apparatus described in our co-pending United States application. But the ozone contact part of the system as described in the present application can equally be used with any other fish rearing system in which nitrite toxicity is a problem. In particular, the settlement tank 110 described in FIG. 2 need not be used. Many fish rearing system do not include a settlement section and others are based on activated sludge, extended aeration and direct biofiltration techniques. The present invention is applicable to all such systems. Similarly, biological filter 134 can be replaced by, for example, activated sludge systems, high rate biofiltration and rotating biodisc systems. All such f. a particulate filter medium having particles of a size in the range 0.5 to 10 mm. positioned on the false floor;

g. water backwash means whereby backwash water can be forced through the inlet for backwash water in the biological filter and through the particulate medium of the filter to clean the medium when required;

h. air scour means whereby air can be forced through the inlet for backwash air in the biological filter and through the particulate medium of the filter to lift and expand the medium and agitate the medium vigorously to permit adequate backwashing of the medium by the backwash water;

i. a stilling box communicating with the outlet for recycled water of the biological filter, the stilling box having an outlet;

j. a sump communicating with the outlet of the stilling box and having an outlet;

k. a recycle pump communicating with the outlet of the sump;

l. an ozone contact unit in which a predetermined amount of recycling water is contacted with ozone in an amount sufficient to lower the total nitrite content of the water to a level acceptable to fish but which amount does not leave free ozone in the water re-entering the rearing tank;

m. an aeration unit positioned between the filter outlet for recycled water and the recycled water inlet of the fish tank whereby water in the system can be aerated and stripped of carbon dioxide;

n. a fresh water inlet in the system; and o. conduit means whereby water can be fed throughout the system.

2. A fish rearing system as claimed in claim 1 in which the ozone contact unit is positioned in a by-pass and in which there are valve means in the conduit means and in the by-pass to control the amount of recycling water fed into the by-pass and thus into the ozone contact unit.

3. A fish rearing system as claimed in claim 2 having a pump in the by-pass to pump water through the ozone contact unit.

4. A fish rearing system as claimed in claim 2 in which the ozone contact unit is used in association with an ozone generator able to generate ozone from oxygen or ozone from air to produce mixtures of ozone-oxygen and ozone-air, respectively.

5. A fish rearing system as claimed in claim 1 in which the ozone contact unit is positioned after the biological filter but sufficiently remote from the recycle water inlet of the fish tank that ozone added to the recycling water in the ozone contact unit can be removed by reaction with nitrite before the recycling water re-enters the fish rearing tank.

6. A fish rearing system as claimed in claim 5 in which the recycling water contacted with ozone in the ozone contacting unit is taken from the stilling box and returned to the sump.

7. A system as claimed in claim 1 in which the primary filtration means is a system able to remove up to 60% of the particulate matter from the water coming from the fish tank in up to 15 minutes.

8. A system as claimed in claim 1 in which the primary filtration means is a settlement tank.

9. A system as claimed in claim 1 in which the aeration unit is positioned after the recycle pump and before the recycle water inlet of the fish tank.

* * * * *